United States Patent [19]
Sorensen et al.

[11] Patent Number: 6,093,777
[45] Date of Patent: Jul. 25, 2000

[54] DENDRITIC POLYESTER MACROMOLECULE IN THERMOSETTING RESIN MATRIX

[75] Inventors: Kent Sorensen, Perstorp; Bo Pettersson, Lund, both of Sweden; Louis Boogh, Crissier; Jan-Anders Edvin Manson, St. Sulpice, both of Switzerland

[73] Assignee: Perstorp AB, Perstorp, Sweden

[21] Appl. No.: 08/963,038

[22] Filed: Nov. 3, 1997

Related U.S. Application Data

[63] Continuation-in-part of application No. 08/575,159, Dec. 19, 1995, abandoned.

[30] Foreign Application Priority Data

Dec. 21, 1994 [SE] Sweden .................................. 9904440

[51] Int. Cl.⁷ ........................... C08L 63/02; C08L 67/06; C08G 63/06
[52] U.S. Cl. ....................... 525/438; 525/167.5; 525/174; 525/187; 525/425; 525/440; 525/442; 525/443; 525/444; 525/444.5; 525/445; 525/446; 525/448
[58] Field of Search ................................. 525/438, 167.5, 525/174, 187, 425, 440, 442, 443, 444, 444.5, 445, 446, 448

[56] References Cited

U.S. PATENT DOCUMENTS

| | | |
|---|---|---|
| 3,459,733 | 8/1969 | Byrd, Jr. et al. . |
| 4,342,673 | 8/1982 | Wolfrey . |
| 4,568,737 | 2/1986 | Tomalia et al. . |
| 4,659,778 | 4/1987 | Williams . |
| 5,006,611 | 4/1991 | Schmid et al. ........................... 525/484 |
| 5,041,014 | 8/1991 | Shimizu et al. . |
| 5,041,516 | 8/1991 | Frechet et al. . |
| 5,136,014 | 8/1992 | Figuly .................................... 528/272 |
| 5,478,885 | 12/1995 | Masse et al. .......................... 525/92 D |
| 5,663,247 | 9/1997 | Sorensen et al. ....................... 525/504 |
| 5,728,779 | 3/1998 | Van De Werff et al. ................ 525/118 |

FOREIGN PATENT DOCUMENTS

| | | |
|---|---|---|
| 62-207318 | 9/1987 | Japan . |
| 3-50244 | 3/1991 | Japan . |
| 502634 | 11/1995 | Sweden . |
| 934782 | 8/1963 | United Kingdom . |
| WO 93/17060 | 9/1993 | WIPO . |
| WO 93/18079 | 9/1993 | WIPO . |

OTHER PUBLICATIONS

Crivello et al., J. Poly Sci.: Part A; Poly. Chem.27:3951–3968 (1989).
Cyacure Cycloaliphatic Epoxides Brochure.

*Primary Examiner*—Robert E. Sellers
*Attorney, Agent, or Firm*—Scully, Scott, Murphy & Presser

[57] ABSTRACT

A partially or fully cured thermosetting product which includes a cured and molded product of a thermosetting composition. The composition includes 70% to 99% by weight of at least one thermosetting resin or compound and 1% to 30% by weight of at least one toughening agent. The toughening agent is at least one hyperbranched dendritic macromolecule formed of ester units, optionally in combination with ether units.

13 Claims, 4 Drawing Sheets

1 is LY5082/HY5083

2 is LY505/HY5083 + 5%-w/w toughening agent

DENDRITIC POLYESTER MACROMOLECULE IN THERMOSETTING RESIN MATRIX

CROSS REFERENCE TO RELATED APPLICATION

The present application is a continuation-in-part of U.S. patent application, Ser. No. 08/575,159 filed Dec. 19, 1995, abandoned.

BACKGROUND OF THE DISCLOSURE

The present invention relates to a partially or fully cured thermosetting product. The cured product comprises a molded and cured thermosetting composition which is the reaction product of at least one monomeric or polymeric thermosetting resin and at least one toughening agent having at least one primary or secondary reactive function. The toughening agent comprises at least one hyperbranched dendritic macromolecule substantially built up from ester or polyester units, optionally in combination with ether or polyether units. The hyperbranched dendritic macromolecule is composed of a monomeric or polymeric nucleus to which a number of branching generations are added, said branching generations comprising at least one branching chain extender having three reactive functions. The reactive functions of said branching chain extender are at least one hydroxyl and at least one carboxyl group.

Molded thermosetting materials can be classified in many ways depending on the identified concept. For example, molded thermosetting materials include those with or without reinforcement, and include engineering plastics, laminates, sheet molded sandwich structures and other composite structures. A composite is, in general, classified as a material deriving its properties from two or more components which can be distinguished readily when examined under optical or electron microscopes. The strength and toughness of, for instance, engineering plastics are achieved by combining high strength phases, such as various fibers or particles, and a ductile phase, such as a resin or a resin composition. Molded thermosetting materials are used in a wide variety of applications, which applications require specific properties obtained from included components. The versatility of material property design and processing possibilities obtained by using molded thermosetting materials has been and will remain a major driving force for their use. However, certain drawbacks still remain. Among these are properties related to mechanical anisotropy and also to their relatively high processing costs. Mechanical properties are mainly influenced by properties, such as the toughness, of the cured or semi-cured resin or resin composition. Some important applications areas of molded thermosetting materials and the main requirements for further mechanical improvements are listed in summary below.

| TYPE OF PRODUCT | PROPERTIES IN NEED OF IMPROVEMENT |
|---|---|
| Aeronautic goods and articles | Impact properties, damage tolerance |
| Nautic goods and articles | Moisture absorption, impact |
| Chemicals/chemical goods and articles | Chemical resistance, notch sensitivity |
| Automotive goods and articles | Low velocity impact, fatigue tolerance |
| Sporting goods and articles | Fatigue, impact, low velocity impact |
| Leisure/commodity goods and articles | Damage tolerance, low velocity impact |
| Electric/electronic goods and articles | Thermal shock resistance |

The toughness of a cured or semi-cured resin or resin composition is one of the most important intrinsic properties of a molded thermosetting material, such as a laminate, a sandwich structure, a composite or the like, controlling various observable damages and failure mechanisms. Important mechanical properties and failure mechanisms can be summarized:

The fatigue properties are controlled by the rate of crack growth through the material dependent of the inherent toughness and durability of said resin or resin composition and interfaces.

The impact properties are characterized by the energy absorbed, the damage area and the residual strength after impact. The toughness of said resin or resin composition limits the extent of damage thus allowing good residual strength.

The low velocity impact property is the resistance to small impacts due to mishandling, such as dropping and stone hitting (important in automotive applications). The extent of damage is mainly controlled by the toughness of said resin or resin composition and adhesive properties.

The damage tolerance and notch sensitivity are related to the presence of defects. These can originate from low velocity impacts, machining or production defaults. The further cracking of for instance a laminate, a sandwich material or other composite structures will involve cracking by traverse cracking (predominantly in 90° oriented plies) and delamination. Toughness is thus a major controlling parameter.

The toughness of said resin or resin composition is also important in controlling the edge effects of parts of said molded materials and the thermal loading inducing delamination. The prolongation of delamination may induce interfacial failures.

The resin or resin composition has been shown to play an important role in the performance of for instance fibrous materials. This is disclosed in "The Role of the Polymeric Matrix in the Processing and Structural Properties of Composite Materials", J. C. Seferis and L. Nicolais, Plenum Press, New York, 1983. The resin or resin composition will not just control the maximum service temperature, due to its glass transition, but also moisture sensitivity and aging properties of the cured or semi-cured molded material. Furthermore, defects induced during processing can often be avoided by adjusting and controlling resin viscosity and fiber or particle wetting characteristics. The anisotropic nature of molded materials further emphasizes the importance of the mechanical properties of the cured or semi-cured resin or resin composition. Interlamilar properties are mainly affected, as are intralamilar properties, where low level damage propagation occurs through cracking. Therefore, the properties of the resin or resin composition are of primary interest in the development of new thermosetting molded materials.

The toughness of said resin or resin composition is important when considering damage initiation and fracture of said molded materials. It will affect properties such as the interlamilar crack resistance, impact energy absorption, damage propagation and fatigue resistance. These are often limiting characteristics for the materials in high performance applications. Reinforced epoxy materials are, for instance, widely used as structural load bearing elements where low toughness properties will affect the durability of the material and impose severe limits on design parameters. Toughness implies energy absorption before failure occurs. The energy absorption at a crack front can be achieved through various deformation mechanisms, as for instance disclosed in "Sources of Toughness in Modified Epoxies", R. A. Pearson, Ph.D. thesis, University of Michigan, 1990, which are most effectively induced by the presence of a second phase in the form of particles. The secondary phase is often introduced in the form of rubber particles which normally leads to a considerable increase in the resin viscosity.

The plastic strain to failure can be increased by reduction of the crosslink density or the use of plasticizers. This, however, will very strongly affect the modulus and thermal properties of the material, only giving a moderate increase in toughness. The toughness can effectively be increased by addition of a toughening agent, such as said particles. The effect of particle toughening will, regardless of the nature of the particle, depend on the particle size, interparticle distance and volume fraction. Toughening particles include glass particles, rubber particles and thermoplastic particles having either a rigid core and a soft shell or a soft core and a rigid shell structure. These particles can have different adhesive properties to the surrounding resin or resin composition, which affect their toughening effect and influence the modulus of said resin or resin composition. Toughening systems can furthermore include phase separation during curing. A dispersed spherical phase is usually created in such a process.

Today commonly used toughening agents include rubber, carboxyl terminated butadiene acrylonitrile (CTBN rubber), latex and short reactive thermoplastic chains such as polyetherimides. CTBN rubber is the most effective and most widely used toughening agent. However, it very strongly affects the thermal and mechanical properties in the resin matrix. A combination of CTBN rubber and glass particles reduces the negative effect on the mechanical properties. Polyetherimide modifiers are most recently developed systems. These systems do not affect the thermal and mechanical properties of the matrix, but are less effective as toughening agents.

Processing techniques for reinforced molded materials often involve a wetting stage of a reinforcing bed. The wetting is most often done using a resin in liquid state thus requiring a controlled viscosity. The viscosity should be low in order to obtain a good penetration of for instance a fiber bed, a proper wetting of the fibers and a reduced wetting time. Toughened resins or resin compositions as disclosed above generally exhibit increased viscosity and toughening particles are often too large to be able to freely penetrate the reinforcing bed. As a consequence, in processing techniques producing superior quality molded thermosetting materials or allowing products having a complex geometry to be produced at high productivity rates, particles will be subject to segregation, percolation or shear field segregation. The effect of such toughening agents will therefore strongly be reduced and can even become a source of weak spots if they agglomerate to a large extent. This kind of processing include lamination, prepreging and/or impregnation techniques, such as infusion, compression transfer, vacuum molding, transfer molding, injection molding, gas assisted injection molding, structural injection molding, filament winding, resin immersion, resin infusion, press molding and vacuum molding. Further processing techniques include die forming such as extrusion, rotary molding, gravity molding, blow molding, casting and pour molding. Thus, the quality of the impregnation will decrease and processing times increase and even the quality of the final product may decrease. This is of course very much dependent on the particle size and to a lesser extent the particle volume fraction. The toughening effect of smaller particles is not optimal. Larger particles can be applied using an interleaf layer between plies of a sandwich structure or other composite material. This will increase the toughness of the interlamilar region where delamination occurs, but will not increase the toughness within the plies. CTBN rubber strongly increases the resin viscosity thus limiting the volume fraction that can be used.

Through the present invention is possible to produce a molded thermosetting product, wherein the thermosetting resin has increased toughness properties without, or only slightly affecting processability, thermal and other mechanical properties. The thermosetting product comprises a toughening agent, which toughening agent is a hyperbranched dendritic macromolecule built up from ester or polyester units, optionally in combination with ether or polyether units. The toughening properties of said macromolecule are excellent and most important, toughening can be obtained without imparting the modulus or the thermal properties of the thermosetting resin or resin composition included in the resultant thermosetting product.

Hyperbranched dendritic macromolecules, including dendrimers, can generally be described as three dimensional highly branched molecules having a treelike structure. Dendrimers are highly symmetric, while similar macromolecules designated as dendritic or hyperbranched may to a certain degree hold an asymmetry, yet maintaining the highly branched treelike structure. Dendrimers are monodisperse or substantially monodisperse hyperbranched dendritic macromolecules. Hyperbranched dendritic macromolecules normally consist of an initiator or nucleus having one or more reactive sites and a number of branching layers and optionally one or more spacing layers and/or a layer of chain terminating molecules. Continued replication of branching layers normally yields increased branch multiplicity and, where applicable or desired, increased number of terminal functions or sites. The layers are usually called generations and the branches dendrons. Hyperbranched dendritic macromolecules can be illustrated by below simplified Formulas (I) and (II) wherein X and Y are initiators or nuclei having four and two reactive sites, respectively, and A, B and C are branching chain extenders having three (A and C) and four (B) reactive sites, each branching chain extender forming one branching generation in the macromolecule. T is a terminating chain stopper or a suitable terminal function or site, such a hydroxyl, a carboxyl or an epoxide group. The hyperbranched dendritic macromolecule of Formula (I) holds four equal and the macromolecule of Formula (II) two equal so called dendrons linked to respective nucleus. The dendrons of the macromolecule of Formula (I) is as disclosed by simplified Formula (III). A dendron can be preproduced, and then added to a nucleus, by for instance condensing one or more hydroxyfunctional carboxylic acids, by allowing mono, di, tri or polyfunctional carboxylic acids to form esterlinks with mono, di, tri or polyfunctional alcohols or epoxides or by similar procedures resulting in esterlinks, etherlinks or other chemical bonds. The raw materials used to produce a dendron must be chosen to provide at least one terminal function reactable to a nucleus or initiator.

Hyperbranched dendritic macromolecules are not yet in all respects fully characterized and are distinguished from the well-known ordinary linear or branched molecules or macromolecules and likewise distinguished from the likewise well-known so called star or starbranched molecules and macromolecules. Hyperbranched dendritic macromolecules as disclosed by Formula (I) and (II) can by no means be compared with said well-known molecules, neither in regard of molecular structure nor in regard of chemical and/or physical properties. Increased branch replication in a hyperbranched dendritic macromolecule yields increased branch density and if desired increased number of terminal functions or sites, neither, of these distinguishing properties are exhibited by said well-known and ordinary molecules. Increased branch replication in a star or starbranched molecule or macromolecule does neither yield said increased branch density nor said increased number of terminal functions or sites. A star or starbranched macromolecule can be illustrated by below simplified Formula (IV) wherein Z is a nucleus having six reactive sites, D is a linear or branched chain extender having two reactive sites and T is a chain termination or suitable terminal function.

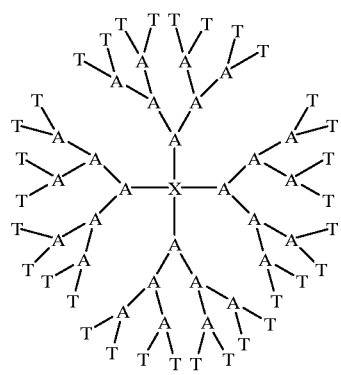

Formula (I)

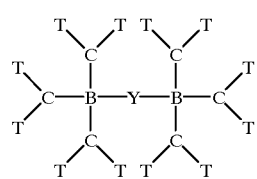

Formula (II)

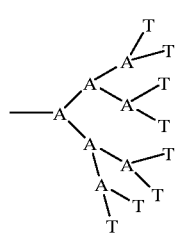

Formula (III)

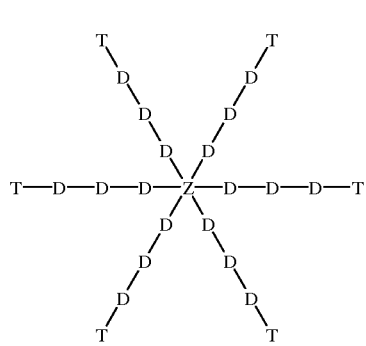

Formula (IV)

Utilization of a hyperbranched dendritic macromolecule in accordance with the present invention as toughening agent allows the toughness of high performance thermosetting compositions to be increased without affecting the thermomechanical properties and the processability. A relatively high molecular weight toughening agent will facilitate the control of the phase separation process and increase its efficiency as toughener. However, high molecular weights in general imply a high viscosity which is to be avoided in favor of a low or medium viscosity. Hyperbranched dendritic macromolecules used as toughening agents in accordance with the present invention satisfy the requirements of low viscosity and high molecular weight. Hyperbranched dendritic polymers exhibit lower viscosities than linear or starbranched polymers of comparable molecular weight. The mechanical properties of a hyperbranched dendritic macromolecule will substantially be determined by the interior architecture of said macromolecule and the chemical structure of the outer or shell structure, such as terminal functions or sites, chain termination, functionalization and the like, will define for instance phase separation processes. The inner and especially the outer structure will, consequently, normally influence and/or determine the mechanical properties of a molded and cured or semi-cured thermosetting material.

Hyperbranched dendritic macromolecules exhibit a spherical structure resembling that of particles. There is, however, no singularity in mechanical properties at the interface of said macromolecules and surrounding resin or resin composition (the so called resin matrix) as with various particles. Isolated hyperbranched dendritic macromolecules have in the case of phase separation, residual miscibility in said resin or resin composition, which due to the relatively high molecular weight, the unique molecular structure and large number of reactive sites will increases the toughness of said molded and cured or semi-cured thermosetting material. Increased toughness, due to impacting forces being effectively distributed within the hyperbranched structure of said macromolecules, is also obtained using said hyperbranched dendritic macromolecules as toughening agent. Hyperbranched dendritic macromolecules do not or only moderately increase the viscosity and are of a small diameter despite the relatively high molecular weight. The macromolecules do not as for instance pre-shaped particles impart the processability of the system. The obtained toughening effect will contrary to the interleaf technique be distributed homogeneously in all levels of the material.

The functionality and polarity of a hyperbranched dendritic macromolecule, used as toughening agent according to the present invention, can as previously disclosed be adapted to any resin system to provide appropriate reactive functions or sites as well as phase separation properties. Said macromolecules are therefore not as sensitive to different matrix chemistry as for instance polyetherimide modifiers requiring a modification of the entire resin chemistry. The relatively high molecular weight of said hyperbranched dendritic macromolecule makes for instance the control of the phase separation easier.

The thermosetting composition of the present invention, which is cured to produce the product of this invention, includes as one component, a curable and moldable thermosetting compound or resin. Among the thermosets within the contemplation of the present invention are thermosetting resins or compounds such as epoxy resins, polyesters, allyl resins non-etherated amino resins, phenolics, silicone resins, polyimides, furan resins polyurethane, and polyisocyanates.

Epoxy resins are monomers or prepolymers that further react with curing agents to yield high performance thermosetting molded products. Widely used epoxy resins are linear or branched aliphatic and aromatic epoxides and epoxy resins, such as polyglycidyl ethers derived from for instance bisphenol A or F and epichlorohydrin, ester epoxides or epoxy resins, epoxidized cresol or phenol novolac resins. Epoxies are in general bisphenol A or F type novolacs and derivative thereof. Cycloaliphatic epoxy resins are a further group of epoxies renowned for their high-performance properties in coating applications. Thermoset molding epoxy compositions are multicomponent mixtures based on said epoxides or epoxy resins, hardeners and various fillers and reinforcements. The exact nature of the compounds or resins is usually dictated by the application and the molding procedure to be used. Moldable epoxies and epoxy resins are formulated to meet stringent requirements regarding flow, reactivity, electrical properties, humidity and thermal resistance. The resin system may be formulated to cure at either room temperature or at elevated temperatures. The good adhesive properties and the low shrinkage on cure of epoxies and epoxy resins normally requires incorporation of an release agent into the molding formulation. Epoxy resins require a hardener, accelerator or crosslinking resin such as amines, amides, polyamines, polyamides, dicyandiamides, Lewis acids; isocyanates, functional urethanes or polyurethanes, acid anhydrides, phenol-formaldehyde resins and/or amino resins. Cycloaliphatic epoxy resins are most easily cured by acids, amine curing agents have poor effect due to low reactivity and possible aminolysis of esterlinkages at the high curing temperatures required to gel and vitrify the product. Cationically cured, such as radiation cured, cycloaliphatic epoxide coating formulations wherein the curing agent is for instance an iodonium salt have been developed and reported to yield very high solids coatings, which of course not is encompassed by the appended claims. Such formulations are reported and disclosed in "Alkoxy-Substituted Diaryliodonium Salt Cationic Photoinitiators" by J. V. Crivello and J. L. Lee, published in J. Pol. Sc. 1989, pp 3951–3968, Product Information "Cyracure" issued by Union Carbide Chemicals and Plastics Co. Inc., and in U.S. Pat. No. 4,342,673, Wolfroy 1982. This is, furthermore, reported in WO 93/17060 (U.S. Pat. No. 5,418,301) wherein a hyperbranched dendritic polyester is employed as flexibilizer in a coating formulation including a cycloaliphatic diepoxy and an iodonium salt.

Polyurethanes are formed through an addition reaction between isocyanates or polyisocyanates and alcohols, polyalcohols or phenols.

Amino resins are thermosetting polymers made by combining an aldehyde with a compound containing an amino group. The two most important types of amino resins used in molding compositions are methylolmelamines and methylolureas. One of the most important applications for methylolmelamines and methylolureas are decorative and industrial laminates. Etherified amino resins, for instance methylated, such as hexamethoxymethylmelamine, and butylated melamines and ureas are important as amino crosslinkers for curing of coating compositions, such as paint films.

Thermosetting polyesters can be produced from such compounds as phthalic or maleic anhydrides and polyfunctional alcohols. Catalyzation is generally achieved by the use of free radical producing peroxides. Unsaturated diallylphthalate and/or vinyl toluene monomers are frequently added to promote flow and to extend flow life. Crosslinking occurs through free radical initiated polymerization of for instance maleic or fumaric double bonds or by copolymerization with added unsaturated monomers. Since no volatile products are evolved during cure, these materials can be fabricated by low pressure molding with very short molding cycles.

Allyl resins used in the manufacture of thermosetting molded products are either the orthophthalate or the isophthalate prepolymer. The diallyl phthalate monomer is an ester produced by the esterification process involving a reaction between an acid (o-phthalic anhydride or isophthalic acid) and an alcohol (allyl alcohol). The monomer is capable of being crosslinked and polymerized in the presence of for instance peroxide catalysts. Due to their outstanding property profile and the ability to retain properties even then subjected to severe environmental conditions involving elevated temperatures, high ambient humidity under load over time has led to their use applications wherein unfailing performance is essential.

A further and widely used group of unsaturated resins or compounds are vinyl esters which can be exemplified by reaction products of epoxies and acrylic or methacrylic acid. Vinyl esters have properties in-between unsaturated ester/polyesters and epoxy resins. They usually combine good mechanical properties with excellent chemical resistance.

Thermosetting polyimides are substantially derived from polyamic acids by either chemical or thermal treatment over a temperature range from room temperature to 300° C. Conversion of bismaleimide to polymeric systems require copolymerization with amines or nucleophilic monomers via a Michael addition reaction or with olefinic or acetylenic monomers.

Phenolic based thermosetting molded products are, by far the most widely known and used of all the thermosets. Over the last nine decades, since Dr. Baekeland's successful reaction between phenol and formaldehyde (Bakelite), phenolics have found applications in chemical, industrial and military areas due to the inherent property profile, diverse range of reinforcements, low cost and extreme ease of molding in most commercial thermosetting molding processes. Phenols react with aldehydes to give condensation products if there are free positions on the benzene ring, ortho and para to the hydroxyl group and formaldehyde is by far the most reactive and commonly used. The reaction is always catalyzed, either by acids or by bases. The nature of the product is greatly dependent on the type of catalyst and the mole ratio of the reactants. There are four major reactions in the phenolic resin chemistry, with the novolac (two stage) and the resole (single stage) being the two most widely used for the production of thermosetting molded products.

Silicone molding resins and compounds utilize a base resin that is the result of reacting silicone with methylchloride to produce methyichlorosilanes. A typical molding composition will contain 20–25% resin (phenyl or methyl siloxanes, 75% filler (mixtures of glass fibers and fused silica), lead based catalysts and pigments and lubricants that promotes flow and good release properties.

Furan resins are the commonly used designation for resins based on furfural, furan, tetrahydrofuran and furfurol (furfuryl alcohol). The furan resins include compounds such as phenol-furfural resins, urea modified furfurol resins, phenol modified furfurol resins, formaldehyde modified furfurol resins, unmodified furfurol resins, halofurans, alkoxyfurans, furfuryl esters, furfuryl ethers and furfural acetates. The major application areas include metal casting cores and molds.

The thermosetting product of the present invention, a partially or fully cured thermosetting material, is produced in a process which comprises subjecting a thermosetting composition to a molding and curing process at a temperature of 0–400° C., such as 10–350° C. or 25–150° C. The thermosetting composition comprises at least (a)70–99% by weight, preferably 80–99% by weight, of at least one thermosetting resin or compound selected from the group consisting of, an epoxy resin, a saturated polyester, an unsaturated polyester, an allyl resin, a polyimide, a polyetherimide, a bismaleimide, a phenol-formaldehyde resin, a non-etherified amino resin, a silicone resin, a phenolic resin, a furan resin, a polyisocyanate, a polyurethane having at least one hydroxyl, carboxyl or cyano group and a polyurethane having at least one hydroxyl, carboxyl or cyano group; and (b) 1–30% by weight, preferably 1–20% by weight, of at least one toughening agent having at least one primary or secondary functional group, said functional group formed by chain branching, chain termination or functionalization, forming a reaction product with said component (a) by means of covalent bonding, said toughening agent comprising at least one hyperbranched dendritic macromolecule formed of ester units, optionally in combination with ether units, said hyperbranched dendritic macromolecule comprising a monomeric or polymeric nucleus having at least one reactive epoxide, hydroxyl, carboxyl, anhydride group or combination thereof, 1 to 20 generations of at least one monomeric or polymeric branching chain extender, said branching chain extender containing at least three reactive groups, of which at least one is a hydroxyl group and at least one is a carboxyl or anhydride group, bonded to said nucleus and, optionally, at least one generation of at least one spacing chain extender, one chain stopper or both. The percentages of components (a) and (b), are based on the total weight of the thermosetting composition.

Chain termination of said macromolecule is preferably obtained by addition of at least one monomeric or polymeric chain stopper to said hyperbranched dendritic macromolecule. A chain stopper is then advantageously selected from the group consisting of an aliphatic or cycloaliphatic saturated or unsaturated monofunctional carboxylic acid or anhydride having 1–24 carbon atoms, an, aromatic monofunctional carboxylic acid or anhydride, a diisocyanate, an oligomer or an adduct thereof, a glycidyl ester of a monofunctional carboxylic or anhydride having 1–24 carbon atoms, a glycidyl ether of a monofunctional alcohol with 1–24 carbon atoms, an adduct of an aliphatic or cycloaliphatic saturated or unsaturated mono, di, tri or polyfunctional carboxylic acid or anhydride having 1–24 carbon atoms, an adduct of an aromatic mono, di, tri or polyfunctional carboxylic acid or anhydride, an epoxide of an unsaturated monocarboxylic acid or corresponding triglyceride, which acid has 3–24 carbon atoms and an amino acid. Suitable chain stoppers are for instance formic acid, acetic acid, propionic acid, butanoic acid, hexanoic acid, acrylic acid, methacrylic acid, crotonic acid, lauric acid, linseed fatty acid, soybean fatty acid, tall oil fatty acid, dehydrated castor fatty acid, crotonic acid, capric acid, caprylic acid, acrylic acid, methacrylic acid, benzoic acid, para-tert.butylbenzoic acid, abietic acid, sorbic acid, 1-chloro-2,3-epoxypropane, 1,4-dichloro-2,3-epoxybutane, epoxidized soybean fatty acid, trimethylolpropane diallyl ether maleate, toluene-2,4-diisocyanate, toluene-2,6-diisocyanate, hexamethylene diisocyanate, phenyl isocyanate and/or isophorone diisocyanate.

It is emphasized that the above-discussed chain stopper includes compounds with or without functional groups. In preferred embodiments where the chain stopper includes functional groups it is these functional groups which serve as the primary or secondary group which covalently bonds to produce a reaction product between component (a) and the toughening agent.

A functionalization of said hyperbranched dendritic macromolecule (with or without chain termination) is preferably a nucleophilic addition, an oxidation, an epoxidation using an epihalohydrin such as epichlorohydrin, an allylation using an allylhalide such as allylchloride and/or allylbromide, or a combination thereof. A suitable nucleophilic addition is for instance a Michael addition of at least one unsaturated anhydride, such as maleic anhydride. Oxidation is preferably performed by means of an oxidizing agent. Preferred oxidizing agents include peroxy acids or anhydrides and haloperoxy acids or anhydrides, such as peroxyformic acid, peroxyacetic acid, peroxybenzoic acid, m-chloroperoxybenzoic acid, trifluoroperoxyacetic acid or mixtures thereof, or therewith. Oxidation may thus result in, for instance, primary and/or secondary epoxide groups.

To summarize, functionalization refers to addition or formation of functional groups and/or transformation of one type of functional groups into another type. Functionalization includes nucleophilic addition, such as Micheal addition, of compounds having functional groups, epoxidation/oxidization of hydroxyl groups, epoxidation of alkenyl groups, allylation of hydroxyl groups, conversion of an epoxide group to an acrylate or methacrylate group, decomposition of acetals and ketals, grafting and the like.

The nucleus of said hyperbranched dendritic macromolecule, is in preferred embodiments selected from the group consisting of a mono, di, tri or polyfunctional alcohol, a reaction product between a mono, di, tri or polyfunctional alcohol and ethylene oxide, propylene oxide, butylene oxide, phenylethylene oxide or combinations thereof, a mono, di, tri or polyfunctional epoxide, a mono, di, tri or polyfunctional carboxylic acid or an anhydride, a hydroxyfunctional carboxylic acid or anhydride.

Said mono, di, tri or polyfunctional alcohols can be exemplified by 5-ethyl-5-hydroxymethyl-1,3-dioxane, 5,5-dihydroxymethyl-1,3-dioxane, ethylene glycol, diethylene glycol, triethylene glycol, propylene glycol, dipropylene glycol, pentanediol, neopentyl glycol, 1,3-propanediol, 2-methyl-2-propyl-1,3-propanediol, 2-ethyl-2-butyl-1,3-propanediol, cyclohexanedimethanol, trimethylolpropane, trimethylolethane, glycerol, erythritol, anhydroennea-heptitol, ditrimethylolpropane, ditrimethylolethane, pentaerythritol, methyl-glucoside, dipentaerythritol, tripentaerythritol, glucose, sorbitol, ethoxylated trimethylolethane, propoxylated trimethylolethane, ethoxylated trimethylolpropane, propoxylated trimethylolpropane, ethoxylated pentaerythritol or propoxylated pentaerythritol.

Said mono, di, tri or polyfunctional epoxide is suitably exemplified by the group consisting of a glycidyl ester of a monofunctional carboxylic acid having 1–24 carbon atoms, a glycidyl ether of a monofunctional alcohol having 1–24 carbon atoms, a glycidyl ether of a di, tri or polyfunctional alcohol, a mono, di or triglycidyl substituted isocyanurate, a glycidyl ether of a condensation product between at least one phenol and at least one aldehyde or an oligomer of such a condensation product, a glycidyl ether of a condensation product between at least one phenol and at least one ketone or an oligomer of such a condensation product, and a glycidyl ether of a reaction product between at least one mono, di, tri or polyfunctional alcohol and ethylene, propylene, butylene and/or phenylethylene oxide.

A branching chain extender of said hyperbranched dendritic macromolecule, is in various preferred embodiments selected from the group consisting of an aliphatic di, tri or polyhydroxyfunctional saturated or unsaturated monocarboxylic acid or anhydride, a cycloaliphatic di, tri or polyhydroxyfunctional saturated or unsaturated monocarboxylic acid or anhydride, an aromatic di, tri or polyhydroxyfunctional monocarboxylic acid or anhydride, an aliphatic monohydroxyfunctional saturated or unsaturated di, tri or polycarboxylic acid or anhydride, a cycloaliphatic monohydroxyfunctional saturated or unsaturated di, tri or polycarboxylic acid or anhydride, an aromatic monohydroxyfunctional di, tri or polycarboxylic acid or anhydride, and an ester prepared from two or more of said hydroxyfunctional carboxylic acids or anhydrides. Said branching chain extenders are for example compounds such as 2,2-dimethylolpropionic acid, $\alpha,\alpha$-bis(hydroxymethyl)butyric acid, $\alpha,\alpha,\alpha$-tris(hydroxymethyl)acetic acid, $\alpha,\alpha$-bis(hydroxymethyl)valeric acid, $\alpha,\alpha$-bis(hydroxy)propionic acid, 3,5-dihydroxybenzoic acid, $\alpha,\beta$-dihydroxypropionic acid, heptonic acid, citric acid, d- or l-tartaric acid, dihydroxymaloic acid and/or d-gluconic acid.

An optional spacing chain extender of said hyperbranched dendritic macromolecule is advantageously selected from the group consisting of an aliphatic monohydroxyfunctional monocarboxylic acid or anhydride, a cycloaliphatic monohydroxyfunctional monocarboxylic acid or anhydride, an aromatic monohydroxyfunctional monocarboxylic acid or anhydride, and a lactone (an inner ether of a monohydoxyfunctional monocarboxylic acid) and can be exemplified by hydroxyacetic acid, hydroxyvaleric acid, hydroxypropionic acid, hydroxypivalic acid, glycolide, $\delta$-valerolactone, $\beta$-propiolactone or $\epsilon$-caprolactone.

The thermosetting composition comprises, in a number of preferred embodiments, and in addition to said thermosetting resin or compound and toughening agent at least one component selected from the group consisting of a reinforcing material, a curing agent, a catalyst, an inhibitor, a stabilizer, a lubricant, a mold release agent, a filler and a pigment.

It will be understood, of course, that said functional groups and/or included curing agents, accelerators or curing resins are combined in such a way that proper chemical reactions are obtained resulting in covalent bonding between component (a) and the toughening agent either directly or through intermediation by a curing agent or resin. Improper combinations often lead insufficient formation of covalent bonds, hence resulting in for instance macroscopic phase separation which is exemplified by embodiment examples 35 and 36.

Said reinforcing material is preferably a material selected from the group consisting of glass fibers or particles, carbon fibers or particles, graphite fibers or particles, mineral fibers or particles, aramide fibers or particles and organic fibers or particles, such as cellulosic fibers or particles. Said glass fibers or glass particles are suitably surface treated with at least one silane, such as methacrylsilane or aminosilane. Said reinforcing material is furthermore and advantageously a fibrous material employed in form of a roll, a sheet, a web, a cloth, threads and cuttings.

The thermosetting product of the present invention is preferably employed in a molding process to produce useful products. This molding process may involve press molding, pour molding, injection molding, gas assisted injection molding, structural injection molding, rotary molding, blow molding, vacuum molding, extrusion, filament winding, die forming, such as extrusion, rotary molding, gravity molding, blow molding, casting and pour molding and includes optionally resin immersion, resin infusion or resin transfer. The molding process comprises suitably spraying a thermosetting product in accordance with the present invention onto or into a pre-shaped mold. Further embodiments of the molding process includes lamination and/or prepreging.

The molding process yields, in addition to other molded articles, a laminated or sheet molded sandwich structure, in form of an overlay, an underlay or an intermediate layer, with at least one additional thermosetting composition, at least one metal or at least one cellulose based substrate.

The thermosetting product of the present invention is advantageously a prepreg obtained by partial curing, to a B-stage, of a roll, a sheet, a web, a cloth, threads or cuttings selected from the group consisting of glass fibers, carbon fibers, graphite fibers, mineral fibers, aramide fibers and organic fibers, which fibers are impregnated with the thermosetting composition of the present invention. These embodiments can be further processed to yield a decorative or industrial laminate, whereby two or more prepregs are laminated together under heat and pressure.

The thermosetting product is suitably a finished or semi-finished decorative or industrial laminate and/or is a finished or semi-finished product selected from the group consisting of aeronautic goods and articles, nautic goods and articles, chemicals and chemical goods and articles, automotive goods and articles, sporting goods and articles, leisure and commodity goods and articles, and electric and electronic goods and articles. All of said materials, goods and articles can optionally have at least one metal plated or metal clad surface.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

Embodiment Examples 1–37 disclose:

Examples 1 and 2 relate to preparation of hyperbranched dendritic polyester macromolecules used as toughening agent.

Examples 3–8 and 22–24 relate to various chain termination and/or functionalization of the hyperbranched dendritic macromolecules of Examples 1 and 2.

Examples 9–15 relate to preparation of epoxide resin matrices wherein the macromolecules of Examples 3–8 are included.

Example 16 is a comparative example wherein a resin matrix outside the scope of the invention is prepared.

Example 17 relate to molding of the resin matrices of Examples 9–16.

Examples 18–21 relate to evaluations of the molded materials prepared in Example 17.

Table 1 presents results obtained in Examples 18–21 with molded materials based on resin matrices of Examples 9–16.

Example 25 relate to preparation, molding and evaluation of an unsaturated resin matrix wherein the macromolecule of Examples 24 is included.

Example 26 show preparation of a partially chain terminated hyperbranched dendritic polyester from the product of Example 2.

Example 27 relate to epoxidation (functionalization) of the product according to Example 26.

Example 28 relate to composites produced from glass fibers and the resin matrices of Example 12, 27 and 16.

Example 29 relate to composites produced from carbon fibers and the resin matrices of Example 12, 13 and 16.

Examples 30–33 relate to preparation and evaluation of reinforced materials wherein the matrix comprises hyperbranched dendritic polymers.

Example 34 relates to the preparation of a dendritic polyester used in Examples 35 and 36 with a cycloaliphatic diepoxy resin and a bisphenol-F epoxide, respectively, to produce thermosetting compositions which were molded and cured.

Examples 35 and 36 are comparative examples which demonstrate improper combinations which resulted in macroscopic phase separation.

Example 37 relates to the formation a thermosetting cured product of a thermosetting composition which is a reaction product of the toughening agent of Example 9 and a bisphenol-F epoxide.

These examples will be better understood by reference to the accompanying drawings of which:

EXAMPLE 1

Figure 1:
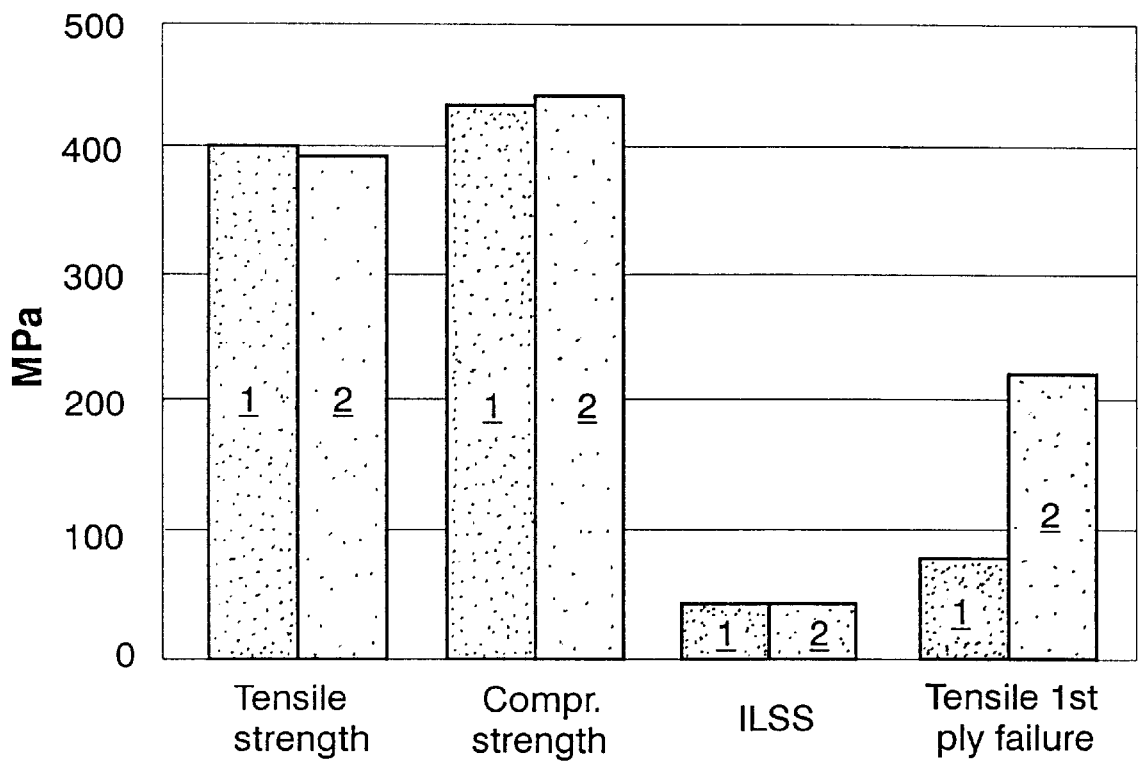
FIG. 1 is a bar graph comparing physical properties of the epoxy thermosetting product and the epoxy laminate of Example 30.

A hyperbranched polyester of 2 generations was prepared from an ethoxylated pentaerythritol and 2,2-dimethylolpropionic acid. 308.9 g (0.85 mole) of pentaerythritol pentaethoxylate (Polyol PP 50, Perstorp Polyols, Sweden), 460.5 g (3.42 moles) of 2,2-dimethylolpropionic acid (Bis-MPA, Perstorp Polyols, Sweden) and 0.46 g (0.004 mole) of $H_2SO_4$ (96%-w/w) were charged in a 4-necked reaction flask equipped with stirrer, pressure gauge, cooler and receiver. The temperature was raised to 120° C., at which temperature 2,2-dimethylolpropionic acid began to melt and esterification water was formed. The temperature was thereafter during 20 minutes raised to 140° C., giving a transparent solution, whereby a vacuum of 30–50 mm Hg was applied. The reaction was, under stirring, allowed to continue for 4 hours, after which time the acid value was determined to be 7.0 mg KOH/g. 460.5 g (6.84 moles) of 2,2-dimethylolpropionic acid and 0.7 g (0.007 mole) of $H_2SO_4$ (96%-w/w) were now during 15 minutes added to the reaction mixture. A vacuum of 30–50 mm Hg was applied when charged 2,2-dimethylolpropionic acid was dissolved. The reaction was now allowed to continue for a further 4 hours giving a final acid value of ~10 mg KOH/g.

The thus obtained toughening agent exhibited the following properties:

Acid value, mg KOH/g: 10.2

Hydroxyl value, mg KOH/g: 500

Molecular weight, g/mole: 1824

EXAMPLE 2

A hyperbranched polyester of 3 generations was prepared by adding a third generation to the toughening agent product of Example 1.

600.0 g of the hyperbranched polyester according to Example 1, 717.0 g (5.35 moles) of 2,2-dimethylolpropionic acid and 0.7 g (0.007 mole) of $H_2SO_4$ (96%-w/w) were charged in a 4-necked reaction flask equipped with stirrer, pressure gauge, cooler and receiver. The temperature was raised to 120° C., at which temperature 2,2-dimethylolpropionic acid began to melt and esterification water was formed. The temperature was thereafter during 20 minutes raised to 140° C., giving a transparent solution, whereby a vacuum of 30–50 mm Hg was applied. The reaction was now under stirring allowed to continue for 5 hours giving a final acid value of ~10 mg KOH/g.

The toughening agent of this example exhibited the following properties:

Acid value, mg KOH/g: 10.6

Hydroxyl value, mg KOH/g: 493

Molecular weight, g/mole: 3311

EXAMPLE 3

A chain stopped hyperbranched polyester was produced from the toughening agent product of Example 2 and oleic acid.

251.2 g of the hyperbranched polyester according to Example 2, 592.3 g of oleic acid, 1.0 g of an inorganic catalyst (Fascat® 4100, Atochem, the Netherlands), 0.5 g of $Ca(OH)_2$ and 55 g of xylene were charged in a 4-necked reaction flask equipped with stirrer, nitrogen inlet, cooler and water trap (Dean-Stark).

The temperature was during 65 minutes raised to 220° C., at which temperature reaction water was formed. The reaction was now allowed to continue until an acid value of <9 mg KOH/g was reached. The reaction time at 220° C. was 420 minutes. The polyester was finally filtered using a small amount of a filter aid (Celite) to remove residual catalysts and formed calcium soaps.

The toughening agent thus obtained exhibited the following properties:

Final acid value, mg KOH/g: 8.2

Hydroxyl value, mg KOH/g: 8.0

Viscosity, 23° C., mPas: 3090

Non-volatile content, %: 100.0

EXAMPLE 4

A partially chain terminated hyperbranched polyester was produced from the toughening agent product of Example 2 and oleic acid.

Example 3 was repeated with the differences:

that 455.8 g of oleic acid were charged instead of 592.3 g and that the reaction at 220° C. was allowed to continue until an acid value of <5 mg KOH/g was reached. The reaction time at 220° C. was 300 minutes.

The toughening agent of this example exhibited the following properties:

Final acid value, mg KOH/g: 4.7
Hydroxyl value, mg KOH/g: 37.0
Viscosity, 23° C., mPas: 7520
Non-volatile content, %: 99.8

EXAMPLE 5

An epoxidized functionalized hyperbranched polyester was produced from the toughening agent product of Example 1 and epichlorohydrin.

100.0 g of the hyperbranched polyester according to Example 1 was charged in a 4-necked reaction flask equipped with stirrer, nitrogen inlet, cooler and water-trap (Dean-Stark). The temperature was raised to 130° C. at which temperature 0.6 g $BF_3$ etherate was added to the reaction mixture. 195.0 g (2.11 moles) of epichlorohydrin was then during 30 minutes added at a rate sufficiently low to suppress observed exothermic reaction. The reaction was allowed to continue at 130° C. for 80 minutes, after which time the temperature was decreased to 100° C. and 100 ml of toluene and 100 ml of 1,4-dioxane were added. 38.7 g (0.97 mole) of NaOH was now during 60 minutes added whereupon the solution became opaque and reaction water was formed. The reaction was allowed to continue for a further 120 minutes and the reaction mixture was thereafter cooled and passed through a pressurized filter to remove precipitated NaCl. Remaining solvents and epichlorohydrin were thereafter removed by means of a rotary evaporator.

The toughening agent of this example exhibited the following properties:

Epoxy equivalent weight (EEW-value), g/equivalent: 285
Hydrolyzable chlorine content, %: 0.6
Viscosity, 23° C., mPas: 21400
Non-volatile content, %: 99.7

EXAMPLE 6

An epoxidized functionalized hyperbranched polyester was produced from the toughening agent of Example 2 and epichlorohydrin.

Example 5 was repeated with the differences:

that 100.0 g of the hyperbranched polyester according to Example 2 were charged instead of the hyperbranched polyester according to Example 1 and that the reaction time at 130° C. was 120 minutes instead of 80 minutes.

The toughening agent exhibited the following properties:
Epoxy equivalent weight (EEW-value), g/equivalent: 311
Hydrolyzable chlorine content, %: 0.9

EXAMPLE 7

An epoxidized functionalized hyperbranched polyester with secondary epoxide groups was produced from obtained toughening agent product according to Example 3 and m-chloroperbenzoic acid.

26.36 g of m-chloroperbenzoic acid and 750 ml of dichloromethane were at room temperature charged in a 3-necked reaction flask equipped with stirrer, nitrogen inlet and cooler. Obtained solution was cooled to 0° C. and 38.86 g of the product according to Example 3 dissolved in 250 ml of dichloromethane were now during 60 minutes instilled. Resulting reaction mixture was at 0° stirred during 120 minutes followed by precipitation of excess m-chloroperbenzoic acid. The reaction mixture was now allowed to react at room temperature for a further 18 hours. Resulting product was thereafter purified by extraction using 3×250 ml of 0.1 M aqueous $Na_2S_2O_3$ followed by 3×250 ml of saturated aqueous $NaHCO_3$. The mixture was allowed to phase separate and the organic layer was removed. The final product was thereafter recovered by removal of solvent under full vacuum at 50° C. using a rotary evaporator.

The toughening agent exhibited the following properties:
Epoxy equivalent weight (EEW-value), g/equivalent: 440
Viscosity, 23° C., mPas: 7000
Non-volatile content, %: 100.0

EXAMPLE 8

An epoxidized functionalized hyperbranched polyester with secondary epoxide groups was produced from the toughening agent of Example 4 and m-chloroperbenzoic acid.

26.36 g of m-chloroperbenzoic acid and 1500 ml of dichloromethane were at room temperature charged in a 3-necked reaction flask equipped with stirrer, nitrogen inlet and cooler. The thus obtained solution was cooled to 0° C. and 100.0 g of the product according to Example 4 dissolved in 800 ml of dichloromethane were now during 120 minutes instilled. Resulting reaction mixture was at 0° C. stirred during 120 minutes followed by precipitation of excess m-chloroperbenzoic acid. The reaction mixture was now allowed to react at room temperature for a further 16.5 hours. The resulting product was thereafter purified by extraction using 3×700 ml of 0.1 M aqueous $Na_2S_2O_3$ followed by 2×250 ml of saturated aqueous $NaHCO_3$. The mixture was allowed to phase separate and the organic layer was removed. The final product was thereafter recovered by removal of solvent under full vacuum at 50° C. using a rotary evaporator.

The toughening agent exhibited the following properties:
Epoxy equivalent weight (EEW-value), g/equivalent: 436
Viscosity, 23° C., mPas: 30000
Non-volatile content, %: 100.0

EXAMPLE 9

A thermosetting composition was prepared by mixing the toughening agent of Example 5 with a commercial epoxide of bisphenol-F type (Araldite®, LY 5082, Ciba-Geigy, Switzerland) having a functionality of 2 and a commercial isophorone diamine curing agent (Hardener HY 5083, Ciba-Geigy, Switzerland) having a functionality of 4. The components were mixed at 23° C. using mechanical stirring for 5 minutes. The resin was subsequently degassed at 23° C. in a vacuum chamber at 0.1 bar for 10 minutes.

The thermosetting composition had the following formulation and properties:

Toughening agent of Example 5, g: 25.0
Araldite® LY5082, g: 75.0
Curing agent, g: 21.3
Amine:epoxide (molar ratio): 1:1
Non-volatile content, %: 100.0
Viscosity at 25° C., mPas: 800

EXAMPLE 10

Example 9 was repeated with the difference that the toughening agent of Example 5 was replaced by the toughening agent of Example 6.

The thermosetting composition had the following formulation and properties:

Toughening agent of Example 6, g: 25.0
Araldite® LY5082, g: 75.0
Curing agent, g: 20.6
Amine:epoxide (molar ratio): 1:1
Non-volatile content, %: 100.0
Viscosity at 25° C., mPas: 900

EXAMPLE 11

Example 9 was repeated with the difference that the toughening agent of Example 5 was replaced by a substantially reduced percentage of the toughening agent of Example 7.

The thermosetting composition had the following formulation and properties:

Toughening agent of Example 7, g: 1.0
Araldite® LY5082, g: 99.0
Curing agent, g: 22.7
Amine:epoxide (molar ratio): 1:1
Non-volatile content, %: 100.0
Viscosity at 25° C., mPas: 600

EXAMPLE 12

Example 9 was repeated with the difference that the toughening agent of Example 5 was replaced by a reduced percentage of the toughening agent of Example 7.

The thermosetting composition had the following formulation and properties:

Toughening agent of Example 7, g: 5.0
Araldite® LY5082, g: 95.0
Curing agent, g: 22.6
Amine:epoxide (molar ratio): 1:1
Non-volatile content, %: 100.0
Viscosity at 25° C., mPas: 700

EXAMPLE 13

Example 9 was repeated with the difference that the toughening agent of Example 5 was replaced by the toughening agent of Example 8.

The thermosetting composition had the following formulation and properties:

Toughening agent of Example 8, g: 5.0
Araldite® LY5082, g: 95.0
Curing agent, g: 22.3
Amine:epoxide (molar ratio): 1:1
Non-volatile content, %: 100.0
Viscosity at 25° C., mPas: 600

EXAMPLE 14

Example 9 was repeated with the difference that the toughening agent of Example 5 was replaced by a reduced percentage of the toughening agent of Example 8.

The thermosetting composition had the following formulation and properties:

Toughening agent of Example 8, g: 15.0
Araldite® LY5082, g: 85.0
Curing agent, g: 21.0
Amine:epoxide (molar ratio): 1:1
Non-volatile content, %: 100.0
Viscosity at 25° C., mPas: 1100

EXAMPLE 15

Example 9 was repeated with the difference that the toughening agent of Example 5 was replaced by a combination of the toughening agents of Examples 5 and 8.

The thermosetting composition had the following formulation and properties:

Toughening agent of Example 5, g: 25.0
Toughening agent of Example 8, g: 5.0
Araldite®, g: 70.0
Curing agent, g: 20.7
Amine:epoxide (molar ratio): 1:1
Non-volatile content, %: 100.0
Viscosity at 25° C., mPas: 900

EXAMPLE 16

Comparative Example

A thermosetting composition was prepared by mixing Araldite® LY5082 (bisphenol-F epoxide, Ciba-Geigy, Switzerland) having a functionality of 2 with an isophorone diamine curing agent (Hardener HY 5083, Ciba-Geigy, Switzerland) having a functionality of 4. The components were mixed at 23° C. using mechanical stirring for 5 minutes. The resin was subsequently degassed at 23° C. in a vacuum chamber at 0.1 bar for 10 minutes.

The thermosetting composition had the following formulation and properties:

Araldite® LY5082, g: 100.0
Curing agent, g: 23.0
Amine:epoxide (molar ratio): 1:1
Non-volatile content, %: 100.0
Viscosity at 25° C., mPas: 600

EXAMPLE 17

Thermosetting compositions according to Examples 9–16 were, at 23° C., poured into steel molds having internal dimensions 110×27×2.5 mm and 27×25×10 mm, respectively. The molds were pre-treated with a silicone based mold release agent. The thermosetting compositions were cured in the molds, resulting in molded plastic specimens having dimensions equal to the internal dimensions of the molds. Curing was performed in an oven with circulating air. Schedule:

Heating: 23–80° C., gradient 3° C./minute
Curing: 80° C. during 900 minutes
Cooling: 80–23° C., gradient 6° C./minute

EXAMPLE 18

Samples were obtained by cutting plastic specimens produced from the thermosetting compositions of Examples 9–11, 13 and 15–16, which compositions were molded and cured in 110×27×2.5 mm molds, in accordance with Example 17. The aforementioned cutting was conducted by the use of a rotating saw blade followed by polishing the edges of the samples with a 240 grid sand paper and rinsed with demineralized water. The samples were subsequently dried and aged at 23° C. in air for at least 7 days. Chips were using a razor blade prior to testing cut from the samples.

The Glass transition Temperatures (Tg) were recorded by means of a Perkins-Elmer DSC7 (Differential Scanning Colorimeter) apparatus using the following parameters:

Average sample weight, mg: 20
Temperature range, ° C.: 0–130
Heating gradient, ° C./minute: 10
Cooling gradient, ° C./minute: 150
Stabilization time at 0° C., minute: 5

$$G_{1c} = \frac{K_{1c}^2}{E}(1-v^2)$$

wherein $G_{1c}$=Fracture Energy (J/m$^2$)
$K_{1c}$=Critical Stress Intensity Factor (MPa.m$^{1/2}$)
E=Tensile Modulus (GPa)
$v$=Poisson Ratio Obtained results are given in Table 1.

TABLE 1

| Molded Thermosetting Product Based on Thermosetting Composition of Example | 9 | 10 | 11 | 12 | 13 | 14 | 15 | Comp. Ex.16 |
|---|---|---|---|---|---|---|---|---|
| Tg, ° C. | 64 | 67 | 85 | 85 | 86 | 85 | 68 | 84 |
| E, GPa | 3.1 | 2.9 | 3.1 | 2.9 | 3.9 | 2.4 | 2.8 | 3.0 |
| $K_{1c}$, MPa · m$^{1/2}$ | 0.83 | 1.37 | 0.79 | 1.34 | 1.47 | 2.03 | 1.58 | 0.63 |
| $G_{1c}$, J/m$^2$ | 0.20 | 0.57 | 0.18 | 0.55 | 0.63 | 1.52 | 0.79 | 0.11 |

Tg = Glasstransition Temperature
E = Tensile Modulus
$K_{1c}$ = Critical Stress Intensity Factor
$G_{1c}$ = Fracture Energy Heating gradient, ° C./minute: 10
Obtained results are given in Table 1.

EXAMPLE 19

Samples having the dimensions 100×12×2.5 mm were cut from the plastic specimens produced from the thermosetting compositions of Examples 9–16, which thermosetting compositions were molded and cured in 110×27×2.5 mm mold in accordance with Example 17. Cutting was made by a rotating saw blade and the edges of the samples were polished with a 400 grid sand paper.

The Tensile Modulus (E) were recorded by means of a Zwick Screw tensile testing apparatus equipped with an extensometer.

The following parameters were used:

Extensometer gauge length, mm: 35
Length between grips, mm: 70
Crosshead rate, mm/minute: 2

Obtained results are given in Table 1.

EXAMPLE 20

Samples were, using a rotary saw blade, cut from the plastic specimens produced from the resin compositions of Examples 9–16, which thermosetting resin compositions were molded and cured in 27×25×10 mm molds in accordance with Example 17. The samples were cut to the exterior dimensions 25×25×10 mm and machined for Compact Tension tests according to ASTM E399.

Critical Stress Intensity Factors ($K_{1c}$) according to ASTM E399 were recorded on a Zwick Screw tensile testing apparatus using a crosshead rate of 0.5 mm/min. Obtained results are given in Table 1.

EXAMPLE 21

The Fracture Energy ($G_{1c}$) were determined from the results obtained in Examples 19 and 20 according to the following equation:

EXAMPLE 22

A chain terminated hyperbranched polyester was produced from the dendritic polyester of Example 1 and caprylic/capric acid.

830.0 g of the of the hyperbranched polyester according to Example 1, 677.7 g (4.59 moles) of a mixture of caprylic and capric acid, 2.0 g (0.03 mole) of Ca(OH)2 and 75 g of xylene were charged in a 4-necked reaction flask equipped with stirrer, nitrogen inlet, cooler and water trap (Dean-Stark). The reaction mixture was during 50 minutes heated to 170° C., whereby esterification water began to evaporate. The temperature was now during 120 minutes raised from 170° C. to 210° C., giving a temperature gradient of 0.3° C./minute. The esterification was allowed to continue under stirring for 510 minutes until an acid value of <6 mg KOH/g was obtained. Xylene was thereafter removed by a 20 minutes vacuum evaporation.

The obtained product exhibited the following properties:

Final acid value, mg KOH/g: 4.2
Hydroxyl value, mg KOH/g: 111
Viscosity, 23° C., mPas: 127
Non-volatile content, %: 99.3

EXAMPLE 23

A carboxyfunctional chain stopper was prepared from trimethylolpropane diallyl ether and succinic anhydride.

502.2 g (3.20 moles) of trimethylolpropane diallyl ether (TMPDE-80, Perstorp Polyols, Sweden) and 207 g (2.07 moles) of succinic anhydride were charged in a 4-necked reaction flask equipped with a magnetic stirrer, nitrogen inlet and a cooler. The reaction mixture was during 120 minutes heated to 130° C. and kept at this temperature for a further 120 minutes. The resultant chain stopper was thereafter cooled to room temperature.

The chain stopper exhibited the following properties:

Acid value, mg KOH/g: 368
Hydroxyl value, mg KOH/g: 390
Viscosity, 23° C., mPas: 46

EXAMPLE 24

An unsaturated toughening agent was prepared from the products of Example 22 and Example 23.

400.0 g of the product according to Example 22, 180.0 g of the product according to Example 23, 1.4 g of $H_2SO_4$ (96%-w/w) and 48 g of heptane were charged in a 4-necked reaction flask equipped with stirrer, nitrogen inlet, cooler and water trap (Dean-Stark). The reaction mixture was during 30 minutes heated to 120° C., whereby esterification water began to evaporate. The esterification was allowed to continue at 120° C. for 390 minutes until an acid value of ~8 mg KOH/g was obtained. The product was now neutralized with 3.0 g of $Ca(OH)_2$. Heptane was removed by a 20 minutes vacuum evaporation and the product was finally filtered to remove excess $Ca(OH)_2$ and formed calcium compounds.

The obtained toughening agent exhibited the following properties:

Final acid value, mg KOH/g: 4.9

Viscosity, 23° C., mPas: 13800

Non-volatile content, %: 127

EXAMPLE 25

A first thermosetting composition was prepared by mixing the product according to Example 24 with a commercial unsaturated polyester (Norpol® 20-00, Jotun A/S, Norway) and adding cobalt octoate and methyl ethyl ketone (MEK) peroxide. The components were mixed at 23° C. using mechanical stirring for 5 minutes.

The thermosetting composition was compared to a second thermosetting composition, Norpol® 20-00 to which cobalt octoate and MEK peroxide had been added.

The thermosetting compositions (Compositions 1 and 2) were molded and cured in 27×25×10 mm and 110×27×2.5 mm molds according to the following curing schedule:

23° C.—20 minutes

80° C.—160 minutes i) Samples were, using a rotary saw blade, cut from specimens cured in 27×25×10 mm molds. The samples were cut to the exterior dimensions 25×25×10 mm and machined for Compact Tension tests according to ASTM E399. The critical Stress Intensity Factors ($K_{1c}$) according to ASTM E399 were recorded on a Zwick Screw tensile testing apparatus using a crosshead rate of 0.5 mm/minute.

ii) Samples having the dimensions 100×12×2.5 mm were cut from the specimens cured in 110×27×2.5 mm molds using a rotating saw blade and sample edges were polished with a 400 grid sand paper. The Tensile Modulus (E) were recorded by means of a Zwick Screw tensile testing apparatus equipped with an extensometer.

The following parameters were used:

Extensometer gauge length, mm: 35

Length between grips, mm: 70

Crosshead rate, mm/minute: 2

A summary of the two compared thermosetting products and the results of this test appear in Table 2.

TABLE 2

| Constituency of | First Thermosetting Prod | Comparative Second Thermosetting Prod |
|---|---|---|
| Toughening Agent of Ex. 24 | 5.0 g. | 0 |
| Norpol ® 20-00 | 95.0 g. | 100 g. |
| Cobalt octoate (12% Co) | 1.0 g. | 1.0 g. |
| MEK peroxide | 1.0 g. | 1.0 g. |
| Test Result | | |
| $K_{1c}$ (MPa · m½) | 0.98 | 0.62 |
| E(GPa) | 2.9 | 2.5 |

Tables 1 and 2 demonstrate that molded thermosetting products formed of thermosetting compositions within the scope of the present invention, which include a toughening agent (Examples 9–15 and the first thermosetting product of Example 25) demonstrate a degree of toughness much in excess of unmodified thermosetting products which but for the toughening agent are identical. The thermosetting products exhibiting the highest tensile modulus (E) and critical stress intensity factor ($K_{1c}$) is deemed the product having the most desirable properties. The thermosetting products formed from the thermosetting compositions of Examples 13 and 14 yielded the best products among the evaluated epoxide products. The first thermosetting product of Example 25 also provided excellent properties.

Examples 26 and 27 show that reinforced products according to the present invention exhibit a substantial increase in toughening. The addition of a toughening agent, as defined in accordance with the present invention, imply a surprisingly high degree of toughening.

EXAMPLE 26

A partially chain terminated hyperbranched dendritic polyester toughening agent was produced from the toughening agent of Example 2, oleic, caproic and caprylic acid.

1707.15 g of the hyperbranched dendritic polyester of Example 2, 1408.4 g of oleic acid (Edenor Tl05, Henkel GmbH, Germany), 1038.13 g of a mixture of caproic and caprylic acid (Prifac 2912, Unichema BV, The Netherlands) and 291 g of xylene were charged in a 4-necked reaction flask equipped with stirrer, Dean-Stark separator, nitrogen inlet and cooler. The temperature was during 150 minutes raised to 180° C. and was kept at this temperature until an acid value of 7.8 mg KOH/g was reached. Azeotropic removal of reaction water began at 158° C.

Obtained toughening agent exhibited the following properties:

Acid value, mg KOH/g: 7.8

Molecular weight, g/mole: 8400

Viscosity, Brookfield, 23° C., mPas: 8450

Non-volatile content, %: 99.6

EXAMPLE 27

An epoxidized (functionalized) hyperbranched dendritic polyester toughening agent was produced from the product of Example 26 and peracetic acid.

600.0 g of the toughening agent according to Example 26 and 390 g of xylene and were charged in a 4-necked reaction flask equipped with stirrer, drop funnel, nitrogen inlet and cooler. The solution was heated to 60° C. at which 278.89 g of peracetic acid (22% aq, EKA Novel AB, Sweden) was gradually added to the reaction solution during a period of 10 minutes. The reaction was allowed to continue for a further 3 hours, after which time the reaction solution was centrifuged to separate the water phase from the organic phase. After removing the water phase containing excess of peracetic acid, peroxide and acetic acid, the organic phase was extracted with water a further 3 times followed by centrifugation. The final product was now recovered by removing the solvent by means of a roll evaporator. A clear yellowish low viscous liquid was obtained.

The obtained toughening agent exhibited the following properties:

Epoxy equivalent weight, g/eq: 851

Molecular weight, g/mole: 8528

Final acid value, mg KOH/g: 7.5

Non-volatile content, %: 98.5

Viscosity, Brookfield, 23° C., mPas: 12300

EXAMPLE 28

Thermosetting products were produced from a plain weave glass fabric and the thermosetting compositions of Examples 12, 13 and 16 (comparative).

The products were processed using a plastic Hypaject II RTM equipment. The reinforcement consisting of said glass fabric were surface treated with an amino silane (A-1100, OSI) and employed in a [0/90] configuration. The thermosetting compositions were degassed during 5 minutes before injection at a pressure of 2.5 bar. Injection was followed by curing at 80° C. for 12 hours. A pre-notch for interlaminar fracture resting was introduced at the mid plane using a Kapton tape. The reinforcement yielded a fiber weight fraction of 55%.

Double Cantilever Beam (DCB) test were carried out according to the ESIS Protocol (Interlaminar Fracture Testing of Composites, Protocol for Joint Round Robin, Mode I: DCB, Mode: ENF, European Group of Fracture, 1990).

The fracture energy ($G_{1c}$) in $J/m^2$ is obtained from said DCB tests and given below:

Product produced from the thermosetting composition of Example 12: 780 $J/m^2$

Product produced from the thermosetting composition of Example 13: 1160 $J/m^2$

Product produced from the thermosetting composition of Example 16: 500 $J/m^2$

EXAMPLE 29

Products in accordance with the present invention were produced from unidirectional carbon fibers and the compositions of Example 12, and Example 16 (comparative).

The products were processed using a Plastec Hypaject II RTM using carbon fibers employed in a +45/−45 lay-up. The thermosetting compositions were degassed for 5 minutes before injection at a pressure of 2.5 bar. Injection was followed by curing at 80° C. for 12 hours. A pre-notch for interlaminar fracture resting was introduced at the mid plane using a Kapton tape. The reinforcement yielded a fiber weight fraction of ~55%.

Double Cantilever Beam (DCB) test was carried out according to the ESIS Protocol (Interlaminar Fracture Testing of Composites, Protocol for Joint Round Robin, Mode I: DCB, Mode: ENF, European Group of Fracture, 1990).

The fracture energy ($G_{1c}$) in $J/m^2$ is obtained from said DCB tests and given below:

Product produced from the thermosetting composition of Example 12: 2470 $J/m^2$

Product produced from the thermosetting composition of Example 16 (comp): 1250 $J/m^2$

EXAMPLE 30

Manufacture of a product of the present invention containing 5%-w/w of the toughening agent of Example 27.

Preparation of Pre-form

Glass weaves (Chomarat AF103.1196R) with a 0/90 lay-up and a surface weight of 540 $g/m^2$ were cut in dimensions 750×157 mm and stacked in 9 layers in an RTM-mold with the same dimensions. The top part of the mold was thereafter closed and sealed.

Preparation of Thermosetting Composition

The basic thermosetting resin used was Araldite® LY5082 (bisphenol-F epoxide, Ciba-Geigy, Switzerland) and the curing agent was an isophrone diamine (Hardener HY 5083, Ciba-Geigy, Switzerland) 5 pph of the toughening agent according to Example 27 was added to said thermosetting resin and curing agent.

Below is an example of preparation of a thermosetting composition for fabrication of a laminate product. In total 4 laminate products were produced using the same procedure as described below and a further 4 laminate products without addition of the toughening agent of Example 27 was also fabricated.

715.0 g of LY5082 and 37.5 g of the toughening agent according to Example 27 were charged to a pressure pot and heated to 45° C. and then degassed at −0.95 bar for 2 hours. 165.0 g of HY5083 was thereafter carefully mixed with the product of LY5082 and the toughening agent and degassed at −0.95 bar prior to injection into the mold:

Injection Procedure for the RTM-Tool

The default settings for the injections were:

Tool temperature during injection: 65° C.

Tool temperature after injection: 805° C.

Resin temperature during injection: 45° C.

Vacuum assistance level: ~−0.7 bar

Injection pressure: 0.75 to 3 bar

Said vacuum of ~−0.7 bar was commonly employed in all 8 injections (4 samples comprising the toughening agent according to Example 27 and 4 control samples without toughening agent) connected to the outlet gate and the bleeded thermosetting composition collected in a trap. A clock was started when the thermosetting composition was mixed and degassed. An initial injection pressure of 0.75 bar was applied and then increased in steps to 2 bar until the composition came out of the outlet. Then the vacuum was disconnected and the pressure was increased to 2.5 bar. Approximately 100–200 g of the thermosetting composition was bleeded out before the outlet was closed. The pressure was then increased to 3 bar, inlet closed and the tool temperature was increased to 80° C. The mold was held at 80° C. for a further 8 hours to fully cure the laminate products before these were removed from the mold.

The obtained products in laminate form were all of excellent quality without voids and with very good wetting. The fiber volume content was in all cases ~48%.

The injection time were in all cases approximately 6 minutes which illustrates that the addition of a hyper-branched dendritic epoxy toughening agent does not negatively affect processability, which often is the case when conventional toughening additives are employed.

The present invention thus has a significant industrial relevance as both improved mechanical performance and low production costs creates a unique price performance balance.

EXAMPLE 31

The effect on first ply failure and tensile fatigue properties when employing a hyperbranched dendritic epoxy toughening agent in an epoxy laminate product.

Specimens tested were the laminate products of Example 30 machined to specified geometries in accordance with the ASTM recommendations for each test method used.

The following mechanical evaluations were performed:

| | |
|---|---|
| Tensile properties: | ASTM D3039 |
| Compressive properties: | ASTM D695M |
| Interlaminar shear properties: | ASTM D2344 |
| Fatigue properties: | ASTM 3479 |

| | |
|---|---|
| The test equipment used were: | |
| Tensile testing machine: | INSTRON 8501/H0162 |
| Load cell: | INSTRON 100 kN 2518-11 UK545 |
| Extentionmeter: | INSTRON 2620-601/1117 |
| Measurement system: | Analogue connection ACSE-12-8,T-51 Workbench/Macintosh SE |
| Acoustic emission: | Physical Acoustics, wide band sensor WD sn. AC03, preamp PA1220 C, digital storage oscilloscope Phillips PM 9750 MHz, analogue oscilloscope Tektronix 2215 60 MHz |
| Weave: | Chomarate AF 103.1196R |
| Fiber content: | 47–48% by volume |
| Lay-up: | 0/90, 50/50 |

Figure 2:
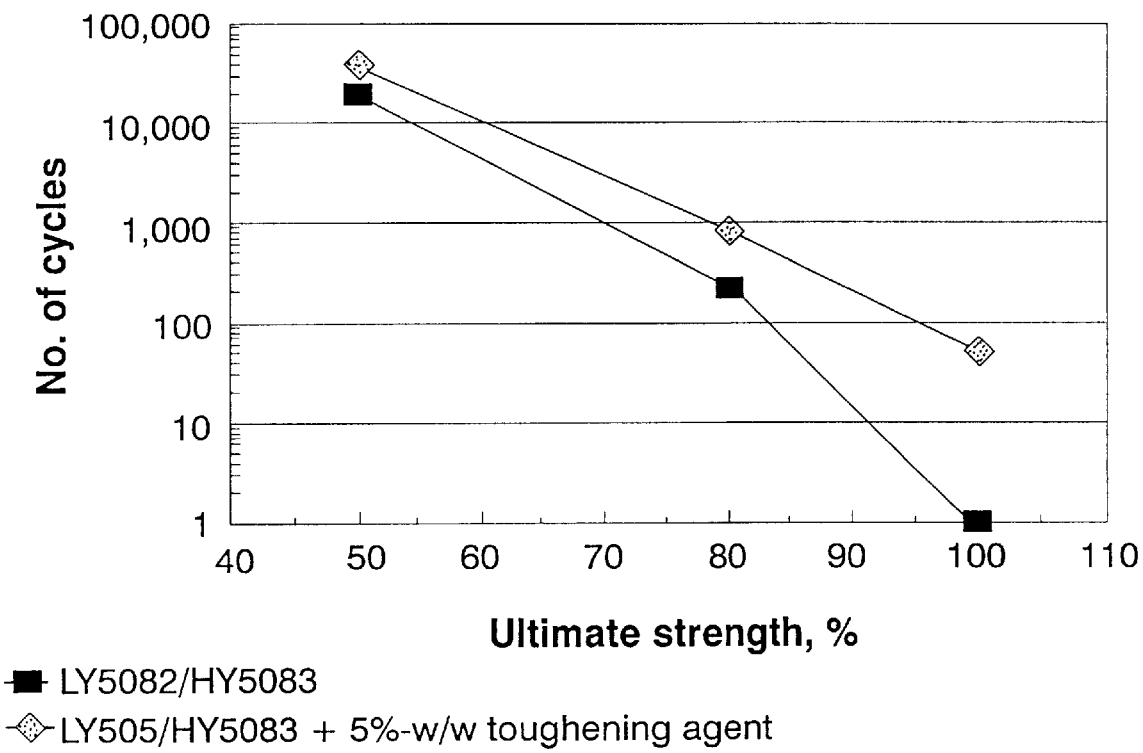
FIG. 2 is a graph of the tensile fatigue strength of the products of Example 30.

The results of these mechanical evaluations are depicted in FIGS. 1 and 2.

As seen from FIGS. 1 and 2, the addition of 5%-w/w of the toughening agent according to Example 27 dramatically reduced damage initiation (first ply failure) and tensile fatigue failure. The above examples illustrate the industrial relevance and commercial impact of the thermosetting product of the present invention. By significantly reducing damage initiation and fatigue failure less product is required for fabrication of parts required to withstand heavy mechanical loads and dynamic forces.

EXAMPLE 32

The effect on damage initiation properties of glass fiber reinforced unsaturated polyester products containing the toughening agent of Example 24.

Preparation of Laminate Products

Two cross ply laminate products were produced, one containing 10%-w/w of the toughening agent of Example 24 and one without that agent.

Preforms were first produced according to T. Forsman, T and L. Berglund, Luleå Technical High School 1996:069:E, Master's thesis, by winding 2400 TEX glass roving on a 200×200×2 mm steel sheet with one layer of Lyvertex 21130 (woven glass fiber with 95% of the fibers in one direction) placed on each side of the wound roving, giving two complete laminate products. The preforms were then placed in a mold of similar dimensions to those of the preforms.

10%-w/w of the toughening agent of Example 24 was added to an isophthalic unsaturated polyester (Norpol 200-000, Jotun Polymer A/S, Norway) and the thermosetting composition was pre-heated to 40° C. at which temperature 1.5%-w/w of methylethylketone peroxide (Norpol nr 11, Jotun Polymer A/S, Norway) and 0.1%-w/w of Cobalt octoate (10% Co) were carefully added to the thermosetting composition. The composition was then injected into a closed mold which was kept at 40° C. for approximately 20 minutes using an injection pressure of 3 bar.

A similar injection procedure was used for a control laminate product made without the toughening agent of Example 24.

No difference in injection times between the two laminate products could be detected which shows that the product of the present invention is easily processed.

The laminate products were, after the above preparation, post cured for 1 hr at 70° C. and then cooled to room temperature and conditioned for a further 24 hrs before material testing.

Mechanical Evaluation

The laminate products were evaluated in a transverse crack test according to T. Forsman, T and L. Berglund, Luleå Technical High School 1996:069:E, Master's thesis, following the procedure of ASTM D3030 with a cross-head speed of 1.26 mm/minute. The formation of cracks were detected by acoustic emission (Physical Acoustics Corp., 1220 C preamp, 60 dB gain).

Figure 3:
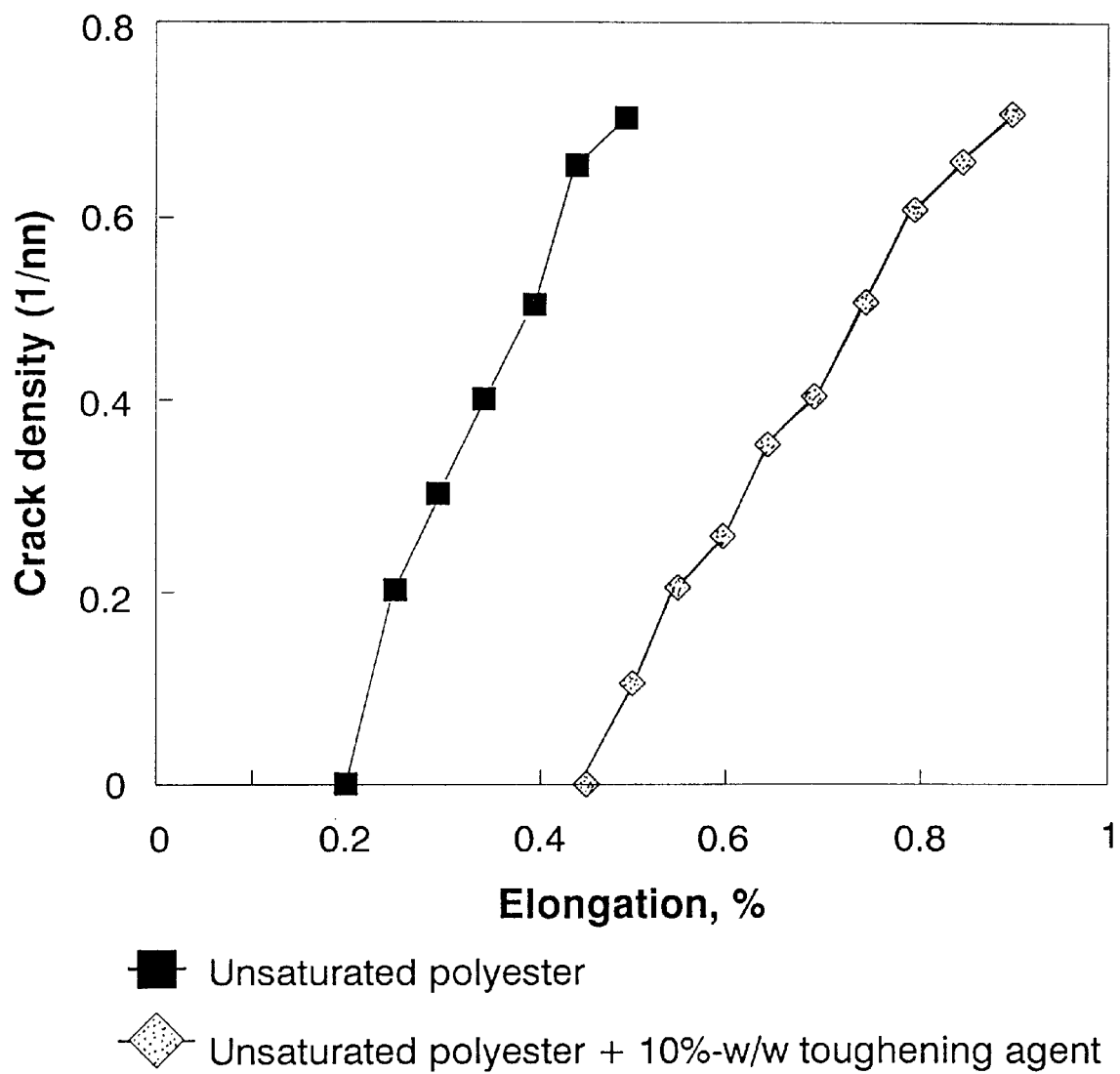
FIG. 3 is a graph of the products of Example 32 subjected to transverse crack testing.

The results obtained in the transverse crack test illustrated in FIG. 3.

As seen from FIG. 3, a dramatic effect on increased transverse elongation before crack initiation occurs when 10%-w/w of the toughening agent of Example 24 was added. The result illustrates the industrial benefits of employing the thermosetting product of the present invention in polyester formulations. Better damage resistant product is obtained which reduces the amount of product needed to produce parts subject to specified loading requirements.

EXAMPLE 33

The aging effects on molded phenolic thermosetting products when 2%-w/w of the toughening agent of Example 27 is added thereto.

Preparation of Thermosetting Composition

2%-w/w of the toughening agent of Example 27 was added by roll mill blending at 100° C., to a glass fiber reinforced phenolic molding thermosetting resin (RX6152, Vyncolit NV, Belgium).

Preparation of Molded Thermosetting Composition

Multipurpose test specimens of the thermosetting composition thus produced were injection molded to yield dimensions according to ISO 178 for evaluation of their flexural strength and strain to failure.

Evaluation

The thus prepared test specimens were tested to determine their aging properties, specifically glycol/water uptake, strain to failure and flexural strength.

Figure 4:
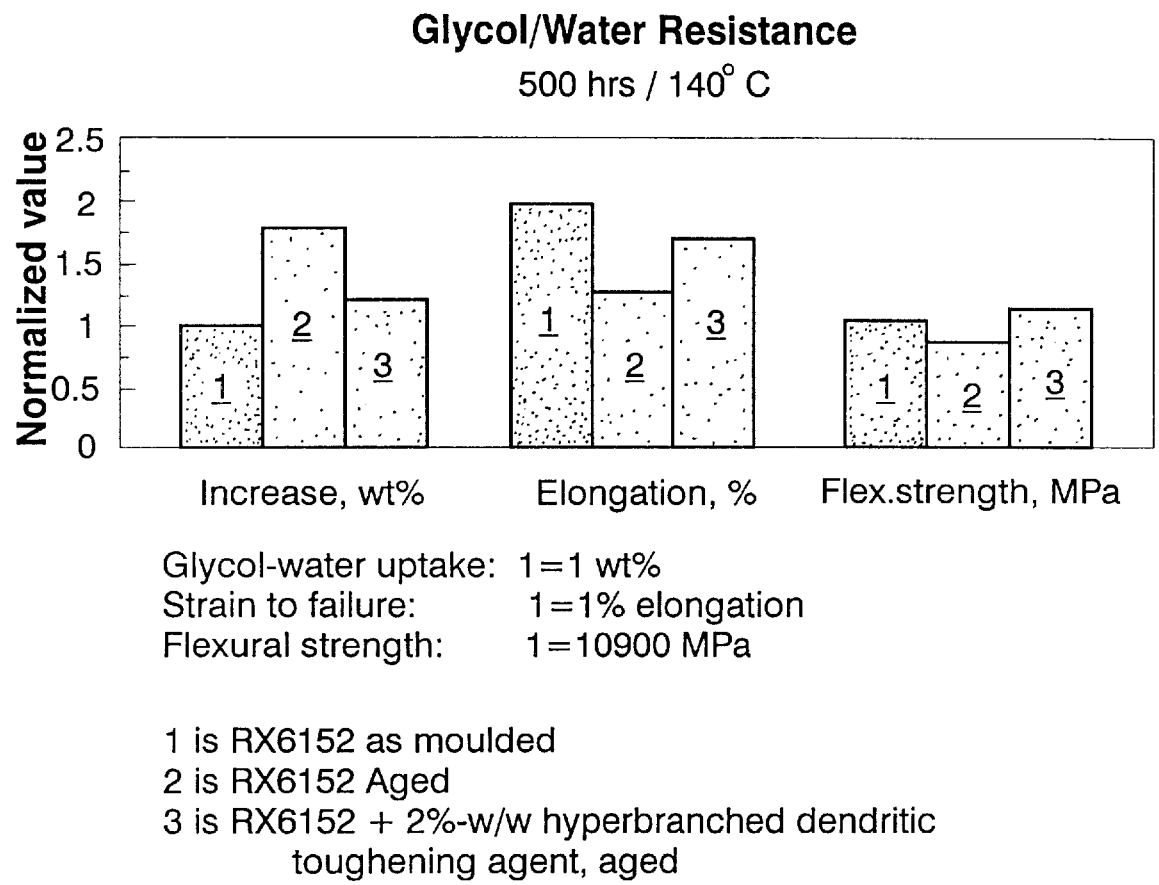
FIG. 4 is a bar graph of the products of Example 32 subjected to the glycol/water resistance test.

The obtained results are summarized in the bar graph of FIG. 4.

As seen from FIG. 4 the increase in glycol/water uptake is reduced when the toughening agent of Example 27 is employed. Furthermore, significantly improved retention of both strain to failure and flexural strength is seen when 2%-w/w of the toughening agent of Example 27 were added to the commercial phenolic molding thermosetting resin. The above results illustrate the remarkable effect of the toughening agent of the present invention of glass fiber reinforced molded phenolic products.

EXAMPLE 34

A dendritic hyperbranched polyester was prepared from ditrimethylolpropane, 2,2-dimethylolpropionic acid and lauric acid.

1.0 mole of ditrimethylolpropane was charged in a 4-necked reaction flask equipped with stirrer, argon inlet, thermometer and cooler. The temperature was raised to 120° C. and 8.0 moles of 2,2-dimethylolpropionic acid together with 0.12 mole of p-toluenesulphonic acid were charged. The temperature was now raised to 140° C. and a stream of argon was allowed to pass through the reaction flask in order to remove formed reaction water. 4.0 moles of lauric acid was after 2 hours at said 140° C. charged and the reaction was allowed to continue for a further 2 hours.

The obtained polyester toughening agent exhibited the following properties:

Viscosity at 23° C., mPas: 1037
Molecular weight: 2045

EXAMPLE 35

The polyester toughening agent of Example 34 was mixed with a cycloaliphatic diepoxy resin (Cyracure® UVR 6100, Union Carbide, USA) at following weight ratio of 30:70, 35:65 and 40:60. An amine curing agent (Hardener HY 5083, Ciba-Geigy, Switzerland) was added resulting in a polyester/epoxy resin to amine molar ratio of 1:1.

The resultant thermosetting compositions were, at 23° C., poured into steel molds having the internal dimensions 110×27×2.5 mm. The molds were pre-treated with a silicone based mold release agent. The compositions were cured (i) at 120° C. for 10 minutes and (ii) at 80° C. for 900 minutes.

Curing resulted in macroscopic phase separation and an oily top surface.

EXAMPLE 36

The polyester toughening agent of Example 34 was mixed with a bisphenol-F epoxide (Araldite® LY 5082, Ciba-Geigy, Switzerland) at a weight ratio of 30:70. An amine curing agent (Hardener HY 5083, Ciba Geigy, Switzerland) was added resulting in a polyester/epoxy resin to amine molar ratio of 1:1.

The resultant thermosetting composition was, at 23° C., poured into steel molds having the internal dimensions 110×27×2.5 mm. The molds were pre-treated with a silicone based mold release agent. The composition were cured (i) at 120° C. for 10 minutes and (ii) at 80° C. for 900 minutes.

Curing resulted in macroscopic phase separation and an oily top surface.

EXAMPLE 37

The epoxy toughening agent of Example 5 was mixed with a bisphenol-F epoxide (Araldite® LY 5082, Ciba-Geigy, Switzerland) at a weight ratio of 30:70. An amine curing agent (Hardener HY 5083, Ciba Geigy, Switzerland) was added resulting in a molar ratio toughening/epoxy resin to amine of 1:1.

The resultant thermosetting composition was, at 23° C., poured into steel molds having the internal dimensions 110×27×2.5 mm. The molds were pre-treated with a silicone based mold release agent. The composition was cured at 80° C. for 900 minutes.

Curing resulted in a perfect bulk material having following properties:

Tg, ° C.: 60
E, GPa: 2.9
$K_{1c}$, MPa.m$^{1/2}$: 0.89
Abbreviations: See Table 1.

What is claimed is:

1. A thermoset product comprising a molded and cured or partially cured thermosetting composition, said thermosetting composition comprising a thermosetting resin matrix which includes a thermosetting resin and a toughening agent, said toughening agent comprising a hyperbranched dendritic macromolecule having at least one reactive group, said macromolecule built up of ester units, optionally, in combination with ether units which is derived from a monomeric or polymeric nucleus having at least one epoxide, hydroxyl, carboxyl or anhydride group, or a mixture thereof; from 1 to 20 generations of at least one monomeric or polymeric branching chain extender bonded to said nucleus, and containing at least three reactive groups wherein at least one is a hydroxyl group and at least one is a carboxyl or anhydride group; and, optionally, at least one generation of at least one spacing extender and/or chain stopper; wherein said weight ratio of thermosetting resin matrix to toughening agent is from 99:1 to 70:30.

2. A thermoset product in accordance with claim 1 wherein said weight ratio of thermosetting resin matrix to toughening agent is in the range of from 90:10 and 80:20.

3. A thermoset product in accordance with claim 1 wherein said thermosetting resin matrix includes a reinforcing material.

4. A thermoset product in accordance with claim 3 wherein said reinforcing material is selected from the group consisting of glass fibers, carbon fibers, graphite fibers and cellulose fibers.

5. A thermoset product in accordance with claim 1 wherein said thermosetting resin matrix includes an agent selected from the group consisting of a curing agent, a catalyst, an inhibitor, a stabilizer, a lubricant, a mold release agent, a filler and a pigment and mixtures thereof.

6. A thermoset product in accordance with claim 1 wherein said thermosetting resin is selected from the group consisting of an epoxy resin, a saturated polyester, an unsaturated polyester, a urethane resin, a polyimide resin, a polyetherimide, a bismaleimide, an amino resin, a silicone resin, a phenolic resin, a furan resin and an allyl resin.

7. A thermoset product in accordance with claim 6 wherein said phenolic resin is phenol formaldehyde.

8. A thermoset product in accordance with claim 6 wherein epoxy resin is a rubber modified epoxy resin.

9. A thermoset product in accordance with claim 6 wherein said unsaturated polyester resin is a vinyl ester resin.

10. A thermoset product in accordance with claim 6 wherein said reactive group of said toughening agent is selected from the group consisting of epoxide, hydroxyl, carboxyl, anhydride, amino and alkenyl.

11. A thermoset product in accordance with claim 1 wherein said molding of said thermosetting resin matrix and said toughening agent occurs by means of press molding, pour molding, injection molding, rotational molding, blow molding, vacuum molding, extrusion molding, die casting, die forming or filament winding.

12. A thermoset product in accordance with claim 1 wherein said curing or partial curing occurs at a temperature in the range of between 0° C. and 400° C.

13. A thermoset product in accordance with claim 12 wherein said curing or partial curing occurs at a temperature in the range of between 10° C. and 150° C.

* * * * *

UNITED STATES PATENT AND TRADEMARK OFFICE
CERTIFICATE OF CORRECTION

PATENT NO. : 6,093,777
DATED : July 25, 2000
INVENTOR(S) : K. Sorensen et al.

It is certified that error appears in the above-identified patent and that said Letters Patent is hereby corrected as shown below:

Column 9,
Line 26, "0-400ºC., such" should read -- 0-400ºC, such --

Column 18,
Lines 56 & 58, Example 17, "3ºC./minute" should read -- 3ºC/minute --

Column 19,
Lines 9-11, Example 17, "C.:" should read -- C: --
"C./" should read -- C/ --
"C./" should read -- C/ --
Line 27, Example 18, "C./" should read -- C/ --
Table 1, "Tg º C." should read -- Tg º C --

Column 21,
Line 44 & 45, Example 24, "23ºC." should read -- 23ºC --
"80ºC." should read -- 80ºC --

Column 22,
Table 2, "0" should read -- -0- --

Column 23,
Line 53, Example 29, "Plastec" should read -- Plastic --

Column 24,
Line 29, Example 30, "45ºC." should read -- 45ºC --

UNITED STATES PATENT AND TRADEMARK OFFICE
CERTIFICATE OF CORRECTION

PATENT NO.    : 6,093,777
DATED         : July 25, 2000
INVENTOR(S)   : K. Sorensen et al.

It is certified that error appears in the above-identified patent and that said Letters Patent is hereby corrected as shown below:

<u>Column 28,</u>
Line 26, "glass fibers, carbon fibers" should read -- glass fibers, aramide fibers, carbon fibers --

Signed and Sealed this

Twenty-fourth Day of December, 2002

JAMES E. ROGAN
*Director of the United States Patent and Trademark Office*